United States Patent
Enstroem et al.

(10) Patent No.: US 8,333,126 B2
(45) Date of Patent: Dec. 18, 2012

(54) DUAL CLUTCH TRANSMISSION

(75) Inventors: Hans Enstroem, Lerum (SE); Andreas Hegerath, Bergheim (DE)

(73) Assignee: Getrag Ford Transmission GmbH, Cologne, DE (US)

(*) Notice: Subject to any disclaimer, the term of this patent is extended or adjusted under 35 U.S.C. 154(b) by 131 days.

(21) Appl. No.: 12/762,248

(22) Filed: Apr. 16, 2010

(65) Prior Publication Data

US 2010/0263465 A1    Oct. 21, 2010

(30) Foreign Application Priority Data

Apr. 17, 2009   (DE) .................. 10 2009 017 537

(51) Int. Cl.
*F16H 3/08*    (2006.01)

(52) U.S. Cl. ........................................... 74/330

(58) Field of Classification Search ............ 74/330
See application file for complete search history.

(56) References Cited

U.S. PATENT DOCUMENTS

| | | | |
|---|---|---|---|
| 7,383,749 B2* | 6/2008 | Schafer et al. .................. | 74/340 |
| 7,395,735 B2* | 7/2008 | Enstrom et al. ................ | 74/661 |
| 2008/0134818 A1 | 6/2008 | Gitt | |

FOREIGN PATENT DOCUMENTS

| | | |
|---|---|---|
| DE | 102009017537 | 1/2010 |
| WO | 2006128626 | 12/2006 |

* cited by examiner

*Primary Examiner* — David D Le
*Assistant Examiner* — Erin D Bishop
(74) *Attorney, Agent, or Firm* — Schlee IP International, P.C.; Alexander R. Schlee

(57) ABSTRACT

A dual clutch transmission is described having first and second input shafts and allowing at short axial length many degrees of freedom for providing various transmission ratios of the individual driving gears. A loose wheel of a reverse driving gear is provided on a third drive shaft and engages a first gear wheel of a step wheel. A fixed wheel of a second forward driving gear is provided on one of the input shafts and is engaged by a second gear wheel of a step wheel. The step wheel is switchable by a first gear shifting clutch that is provided on the second drive shaft and is designed as a first single gear shifting clutch allowing to connect only the step wheel in a rotationally fixed manner to the second drive shaft such that the step wheel co-rotates with the second drive shaft.

14 Claims, 4 Drawing Sheets

DUAL CLUTCH TRANSMISSION

CROSS-REFERENCE TO RELATED APPLICATION

This application claims the priority of the German patent DE 102009017537 having a filing date of Apr. 17, 2009. The entire content of this prior German patent application DE 102009017537 is herewith incorporated by reference.

BACKGROUND OF THE INVENTION

The invention relates to a dual clutch transmission that can be shifted into several driving gears, comprising a first input shaft, a second input shaft, and first, second and third drive shafts.

Such a dual clutch transmission is known from the publication WO 2006/128626. The three drive shafts are connected such as to co-rotate with an output that is designed as a differential transmission. A gear wheel connection is allocated to each driving wheel, the gear wheel connection comprising a loose wheel and a fixed wheel, wherein the loose wheel can be connected by the respective gear wheel connections via the gear shifting clutch in a fixed manner with the shaft for co-rotating therewith, on which shaft the loose wheel is carried. When a fixed connection is established via the gear shifting clutch between the loose wheel and the shaft, the respective driving gear is engaged so that torque can be transmitted between one of the input shafts and the output.

In the WO 2006/128626 a dual clutch transmission comprising a stepped gear is disclosed comprising a first gear wheel and a second gear wheel. The step wheel can be connected via a gear shifting clutch with the drive shaft carrying the step wheel. The first gear wheel is engaged by a loose wheel allocated to a reverse driving gear, this loose wheel being carried on another drive shaft. The second gear wheel of the step wheel is engaged with a fixed wheel that is carried on one of the input shafts. In case of the step wheel having been shifted into gear, i.e. when a fixed connection is established between the step wheel and the drive shaft so that these two co-rotate, a second forward driving gear of the dual clutch transmission is engaged. For engaging the reverse driving gear, it is necessary to establish a fixed connection between the loose wheel of the reverse driving gear and a respective drive shaft so that these co-rotate. When the reverse driving gear is engaged, it has to be guaranteed that the step wheel is no longer connected in a rotationally fixed manner with the drive shaft carrying the step wheel. In this case, the step wheel functions as an intermediate gear wheel for reversing the rotational direction for establishing the reverse driving gear, but does not transmit a torque into the drive shaft of the step wheel.

Even though a low axial dimension can be achieved by the dual clutch transmission according to WO 2006/128626, there is a need for additional dual clutch transmissions that accomplish a short axial length. The structure should be as simple as possible, while at the same time allowing many degrees of freedom for providing various transmission ratios of the individual driving gears.

SUMMARY OF THE INVENTION

According to one aspect of the present invention, the aforementioned objects of making the structure as simple as possible, while at the same time allowing many degrees of freedom for providing various transmission ratios of the individual driving gears while also maintaining a low axial length of the transmission, are achieved by a dual clutch transmission comprising: a first input shaft; a second input shaft; a first drive shaft; a second drive shaft; a third drive shaft; an output that is connected in a fixed manner with the first, second and third drive shafts; and a plurality of driving gears; wherein a gear wheel connection is allocated to each driving gear, the gear wheel connection comprising a loose wheel and a fixed wheel; a shiftable step wheel is provided on the second drive shaft, the step wheel comprising a first gear wheel and a second gear wheel; a loose wheel of a reverse driving gear is provided on the third drive shaft and engages the first gear wheel of the step wheel; a fixed wheel of a second forward driving gear is provided on one of the input shafts and is engaged by the second gear wheel of the step wheel; and the step wheel is switchable by a first gear shifting clutch that is provided on the second drive shaft, said first gear shifting clutch being designed as a first single gear shifting clutch allowing to connect only the step wheel in a rotationally fixed manner to the second drive shaft such that the step wheel co-rotates with the second drive shaft.

DETAILED DESCRIPTION OF THE INVENTION

The invention provides that the step wheel can be switched by a gear shifting clutch that is provided on the second drive shaft, wherein the gear shifting clutch is designed as a single gear shifting clutch allowing only to connect the step wheel in a fixed manner to the second drive shaft for co-rotating therewith.

During the development of a dual clutch transmission it was found out that, surprisingly, gear shifting the step wheel by means of a unidirectionally acting, single gear shifting clutch allows to create a design of the dual clutch transmission having a short axial length and an allover compact design, but at the same time allows many degrees of freedom for the design with respect to the number, location and transmission ratios of the driving gears.

According to a preferred embodiment, the loose wheel of the reverse driving gear can be shifted by another single gear shifting clutch. In this case it is preferred that each of the single gear shifting clutches comprises a respective gear shifting sleeve that can be shifted in axial direction of the shaft. In an end position, the gear shifting sleeve establishes a positive interlocking between the loose wheel and the shaft carrying the loose wheel. In the neutral position N, however, the positively interlocking between the gear shifting sleeve that is connected with the shaft for co-rotating therewith and the loose wheel is released so that the loose wheel—apart from friction—may freely rotate on the shaft. In comparison to a gear shifting clutch allowing to connect two loose wheels that are carried on the same shaft and are positioned adjacent to each other may be connected selectively (dual gear shifting clutch), a single gear shifting clutch allows to establish only one rotationally fixed connection between one loose wheel with the shaft for allowing these to co-rotate, namely in this case the step wheel with the second drive shaft or the loose wheel allocated to the reverse driving gear with the third drive shaft. In case of a dual gear shifting clutch the gear shifting sleeve can be shifted from a first end position in which a first loose wheel is connected with the shaft into a second end position in which a rotationally fixed connection is established between the other loose wheel and the shaft.

The single gear shifting clutch for shifting the intermediate wheel and another single gear shifting clutch for shifting the loose wheel of the reverse driving gear may be coupled via a mutual gear shifting fork. The gear shifting fork transmits forces into the gear shifting sleeve, allowing the gear shifting sleeve of the single gear shifting clutch to be moved. The mutual gear shifting fork has the advantage that both single gear shifting clutches can be actuated by one single gear shifting actuator.

Preferably, the two single gear shifting clutches that are located on different drive shafts and/or the mutual gear shifting fork are located/adapted such that in exactly one position of the gear shifting fork both gear shifting sleeves assume their respective neutral positions. If from this position the gear shifting fork is moved in one axial direction, shifting into the reverse driving gear is accomplished, i.e. the gear shifting sleeve of the other single gear shifting clutch for a shifting of the loose wheel establishes a rotationally fixed connection between the loose wheel allocated to the reverse driving gear and the third drive shaft. At the same time the gear shifting sleeve of the single gear shifting clutch moves the step wheel in axial direction, while this movement does, however, not result in a rotationally fixed connection between the step wheel and the second drive shaft. If, however, the mutual gear shifting fork is moved axially from this position where the gear shifting sleeves assume their neutral position, in the opposite direction, the step wheel is connected to the second drive shaft so that the second forward driving gear of the dual clutch transmission is engaged. In case of the engaged second driving gear, the loose wheel allocated to the reverse driving gear can still freely rotate with respect to the third drive shaft.

By means of this mechanical coupling of the two single gear shifting clutches it can be prevented that the reverse driving gear and the second forward driving gear are engaged at the same time. Therefore, it is not necessary to take additional measures for protecting the dual clutch transmission from simultaneously engaging the reverse driving gear and the second forward driving gear.

Preferably, the fixed wheel of the second forward driving gear is provided on the second input shaft that is designed as a hollow shaft. The first input shaft is in this case designed as a solid shaft positioned coaxially to the hollow shaft.

The second input shaft may carry a fixed wheel of a fourth or a sixth forward driving gear wherein this fixed wheel is provided between the fixed wheel of the second forward driving gear and an input side of the dual clutch transmission. The input side is that side of the dual clutch transmission at which the input shaft is or can be connected to a dual clutch.

Preferably, the loose wheels of the fourth and the sixth forward driving gears can be shifted by means of a gear shifting clutch that is carried by the first drive shaft. The gear shifting clutch is in this case designed as a dual gear shifting clutch, preferably using a gear shifting sleeve that is adapted to assume two end positions and one neutral position between the two end positions. In the end positions, respectively, the gear shifting sleeve provides a fixed connection between the first drive shaft and a loose wheel allocated to the respective end position for co-rotating with the drive shaft.

According to a preferred embodiment, the fixed wheel of the fourth or the sixth forward driving gear and the loose wheel of the reverse driving gear are provided in a plane of the dual clutch transmission that is perpendicular to the main axis of the dual clutch transmission. The main axis of the dual clutch transmission extends preferably coaxially to the input shafts. Preferably, all three drive shafts are spaced apart from each other and extend in parallel to the input shaft.

The first gear wheel of the step wheel may have a smaller diameter than the second gear wheel of the step wheel. This achieves that the transmission ratio of the reverse driving gear is higher than the transmission ratio of the second forward driving gear without making the distance between the axes of the second and the third drive shafts too big. The first gear wheel is preferably provided between the second gear wheel of the step wheel and the input side.

A loose wheel of the third forward driving gear and a loose wheel of the fifth forward driving gear may be provided in the same plane that extends perpendicular to the main axis and may engage the same fixed wheels. This allows saving axial space. However, this results in a dependency of the transmission ratios between the third and the fifth forward driving gears. The plane in which the two loose wheels and the mutual fixed wheel are provided may be in the immediate vicinity of the axial end of the second input shaft that is preferably designed as a hollow shaft. This means that between the axial end of the second input shaft and the mutual fixed wheel, apart from bearings provided between the input shafts, no other component parts such as fixed wheels or gear shifting clutches can be provided.

In the alternative, a fixed wheel of a first forward driving gear may be provided at the axial end of the second input shaft. For being able to support forces acting upon the fixed wheel of the first forward driving gear well, a bearing assembly may be provided between the second and the first input shafts, while this bearing assembly may be carried by a fixed carrier. The fixed carrier may be part of a housing of the dual clutch transmission or may be connected therewith accordingly.

Preferably, the dual clutch transmission comprises six or more forward driving gears. According to a preferred embodiment, seven forward driving gears are provided, wherein a loose wheel is allocated to the seventh forward driving gear and carried on the first drive shaft. This loose wheel is engaged by a fixed wheel that is carried on the first input shaft and preferably designed as a solid shaft.

Preferably, all gear shifting clutches of the dual clutch transmission are located on the first, second and third drive shafts. This results in that the input shafts carry only fixed wheels, no loose wheels.

Preferably, the dual clutch transmission comprises a gear wheel that has the function of a parking lock. This gear wheel is preferably provided on the third drive shaft that carries also the loose wheel of the reverse driving gear. Between the parking lock and the loose wheel allocated to the reverse driving gear, preferably a pinion of the third drive shaft is provided that is engaged with the output gear wheel of the output. The output gear wheel is further engaged by a pinion or fixed wheel of the first drive shaft and a pinion or fixed wheel of the second drive shaft. The pinions of the three drive shafts are provided at the circumference of the output drive gear wheel so that the shaft axes mark a triangle when viewed from the output side.

The invention is discussed in more detail in the following by referring to the drawings.

BRIEF DESCRIPTION OF THE DRAWINGS

In the drawings show.

DETAILED DESCRIPTION OF THE DRAWINGS

Figure 1:
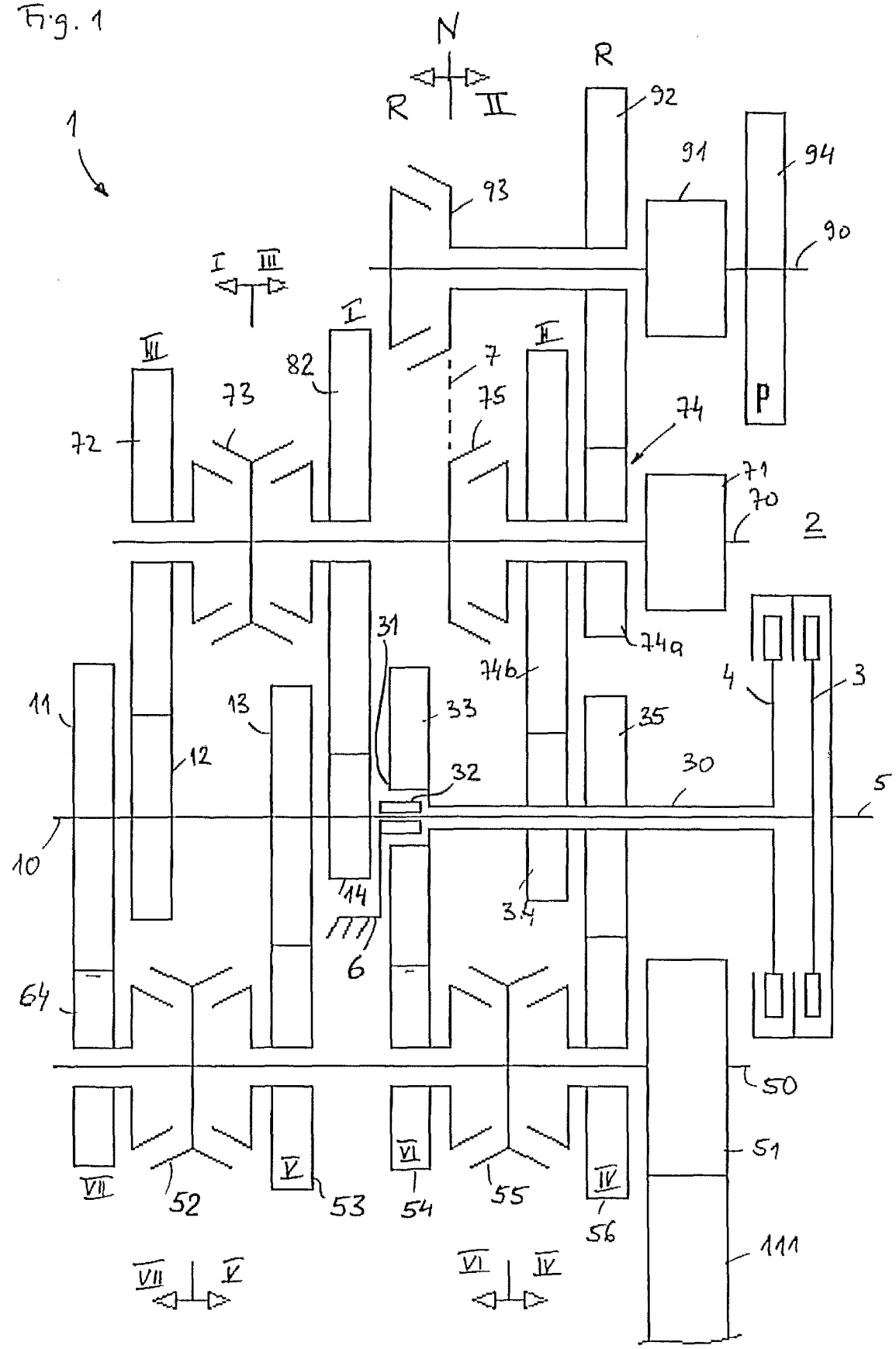
FIG. 1 a schematic longitudinal section of a first embodiment of the invention.

FIG. 1 demonstrates schematically the structure of a first embodiment of the dual clutch transmission according to the present invention. The dual clutch transmission is in general denoted with reference numeral 1. The dual clutch transmission 1 comprises a first input shaft 10 and a second input shaft 30, both input shafts being positioned coaxially with respect to each other. The second input shaft 30 is designed as a hollow shaft, while the first input shaft 10 is a solid shaft. On the input side 2 of the dual clutch transmission a first clutch 3 and a second clutch 4 are located. The first clutch 3 allows connecting the input shaft with a crankshaft 5 of a motor that has not been shown here. By means of the second clutch 4 the second input shaft 30 can be connected to the crankshaft 5.

In parallel to the coaxially positioned input shafts 10, 30 a first drive shaft 50, a second drive shaft 70 and a third drive shaft 90 are provided. In the drawing according to FIG. 1 the input shafts 10, 30 as well as the drive shafts 50, 70 and 90 are provided in one and the same plane. The drive shafts 50, 70, 90 are provided together with their respective pinions and fixed wheels 51, 71, 91 within the circumference of a drive wheel or a ring wheel 111 that has only been show in part. The pinions 51, 71, 91 engage the ring wheel 111. The pinions 51, 71, 91 have different diameters, but may in the alternative be of the same diameter.

Four fixed wheels 11, 12, 13, 14 are connected such with the first input shaft 10 as to co-rotate with that input shaft 10. The fixed wheel 11 engages a loose wheel 64 that is provided on the first drive shaft 50. The wheels 11, 64 provide a gear-wheel connection that is allocated to a seventh forward driving gear VII of the dual clutch transmission 1. The seventh forward driving gear VII is engaged when the gear shifting clutch 52 establishes a connection between the loose wheel 64 and the first drive shaft 50 for co-rotation. The gear shifting clutch 52 is designed as a dual gear shifting clutch since it can not only connect the loose wheel 51 but also another loose wheel 53 located on the drive shaft 50 with the drive shaft 50 for co-rotating therewith. When the loose wheel is connected for co-rotating with the first drive shaft 50, a fifth forward driving gear V is engaged. When the fifth forward driving gear V is engaged and the first clutch 3 is closed, torque is transmitted from the crankshaft 5 via the first input shaft 30 to the fixed wheel 13 and via engagement of the fixed wheels 13 into the loose wheel 53 that is at his point in time connected for co-rotation with the drive shaft 50, and from there via the pinion 51 into the ring wheel 111.

Between the fixed wheels 11, 13 the fixed wheel 12 is located that engages a loose wheel 72 that is provided on the second drive shaft 70. The fixed wheel 14 that is provided very close to one axial end 31 of the second input shaft 30 engages a loose wheel 82 that is provided on the second drive shaft 70. Between the loose wheels 72, 82 that are provided next to each other on the drive shaft 70 a gear shifting clutch 73 is located for engaging a first forward driving gear I and a third forward driving gear III. The gear shifting clutch 73 is therefore also designed as a dual gear shifting clutch.

At the other axial end 31 of the second input shaft 30 a bearing assembly 32 is provided for bearing the second input shaft 30 on the first input shaft 10. The bearing assembly 32 is carried by a fixed carrier 6. This allows bearing of forces acting upon the fixed wheel 14 directly by means of the fixed carrier.

The odd numbered forward driving gears I, III, V can be allocated to a first partial transmission. The first partial transmission can be connected via the first clutch 3 to the crankshaft 5 or separated therefrom.

The dual clutch transmission 1 according to FIG. 1 comprises four additional gears, namely three forward driving gears II, IV and VI and one reverse driving gear R. The three even numbered forward driving gears II, IV, VI and the reverse driving gear R can been allocated to a second partial transmission of the dual clutch transmission 1.

Three fixed wheels 33, 34, 35 are located on the second input shaft 30. The fixed wheel 33 that is the axial end 31 of the second input shaft 30 engages a loose wheel 54 located on the first drive shaft 50. In axial direction next to the loose wheel 54 a gear shifting clutch 55 is located on the drive shaft 50 and adjacent to that gear shifting clutch a loose wheel 56 is provided. The latter is engaged by the fixed wheel 35 that is provided on the second input shaft 30.

By means of the gear shifting clutch 55 either the sixth forward driving gear VI or the fourth forward driving gear IV can be engaged. In this embodiment, the gear wheels 35, 56 that are allocated to the fourth forward driving gear IV are closer to the input side 2 than the gear wheels 33, 54 that are allocated to the sixth forward driving gear VI.

The fixed wheel 34 is located on the second input shaft 30 between the fixed wheels 33, 35, and the fixed wheel 34 engages via a step wheel 74 the second drive shaft 70. The step wheel 74 comprises a first gear wheel 74a and a second gear wheel 74b. The second gear wheel 74b of the step wheel 74 engages the fixed wheel 34. The first gear wheel 74a that has a smaller diameter than the diameter of the second step wheel 74b is engaged with the loose wheel 92 on the third drive shaft 90. Via a second gear shifting clutch 75 the step wheels 74 can be connected with the second drive shaft 70 in a fixed manner to co-rotate therewith. When such a fixed connection has been established, torque can be transmitted via the fixed wheel 34 and the second gear wheel 74b of the step wheel 74 from the second input shaft 30 onto the drive shaft 70 and therefore into the output gear wheel 111. The torque is in this case transmitted with the transmission ratio of the second forward driving gear II.

When the second forward driving gear II is engaged, it has to be guaranteed that the loose wheel 92 is not connected at the same time with the third drive shaft 94 for co-rotation therewith. A gear shifting clutch 93 provides a fixed connection between the loose wheel 92 and the drive shaft 90. Unlike the gear shifting clutch 75 the gear shifting clutch 93 is designed as a single gear shifting clutch. This means that via the respective single gear shifting clutch only one gear can be engaged, respectively. In contrast, for example by means of the gear shifting clutch 55 that is designed has a dual gear shifting clutch, the fourth as well as the sixth forward driving gears can be engaged.

An interrupted line 7 between the gear shifting clutches 75, 93 symbolizes a mechanical coupling between the two component parts. The coupling is achieved via a mutual gear shifting fork allowing to move gear shifting sleeves of gear shifting clutches 75, 93 mutually in axial direction. If for example the gear shifting clutch according to FIG. 1 is moved to the right, a fixed connection for co-rotation is established between the second drive shafts 70 and the step wheel 74, engaging the second forward driving gear II. By moving the mutual gear shifting fork not only the gear shifting sleeve of the gear shifting clutch 75 is moved, but also the gear shifting sleeve of the gear shifting clutch 93 is moved to the right. The movement of the gear shifting sleeve of the gear shifting clutch 93 does, however, not result in a fixed connection between the loose wheel 92 and the third drive shaft 90. If, in contrast, the gear shifting fork is moved from its neutral position N in the drawing according to FIG. 1 to the left, a positive interlocking between the loose wheel 92 and third drive shaft 90 is established, engaging in the reverse driving gear R. Also in this case in an analog manner the movement of the gear shifting fork and therefore of the two gear shifting sleeves of the gear shifting clutches 75, 93 does not result in a fixed connection of a loose wheel provided on the second drive shaft 70. It can be excluded that the reverse driving gear R and the second forward driving gear II are engaged at the same time, even though the respective gear shifting clutches are provided on different shafts.

A gear wheel 94 is connected in a fixed manner with the third drive shaft and functions as a parking lock P. Between the parking lock P and the loose wheel 92 pinion 91 is provided. This means that the parking lock P and the loose wheel and 92 on the one hand and the other gear wheel connections of all other gears of the dual clutch transmission on the other hand are provided on different sides within the same plane that is defined by the pinions 51, 71 and 91 and the ring wheel 111.

Figure 2:
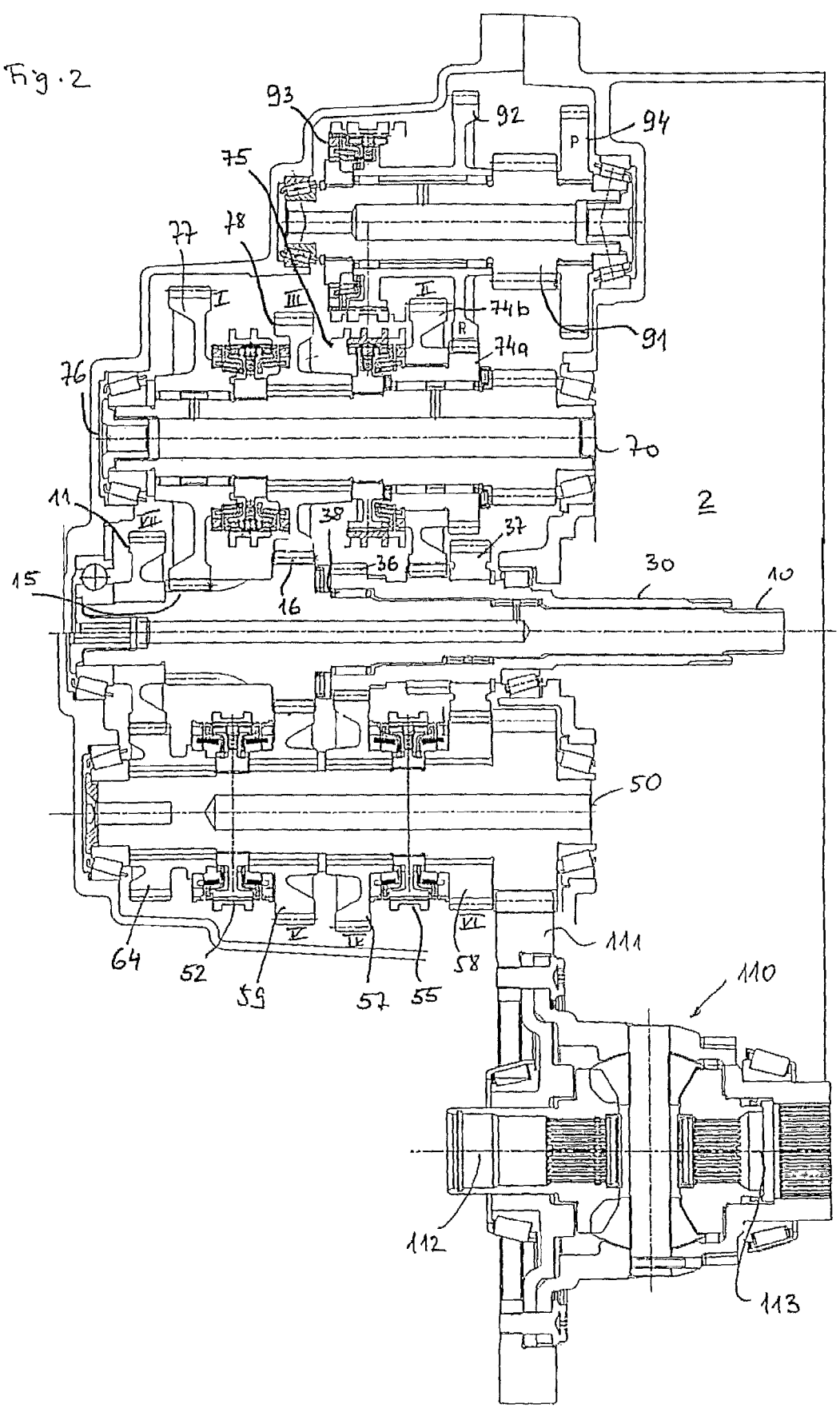
FIG. 2 a longitudinal section of a second embodiment.
Figure 3:
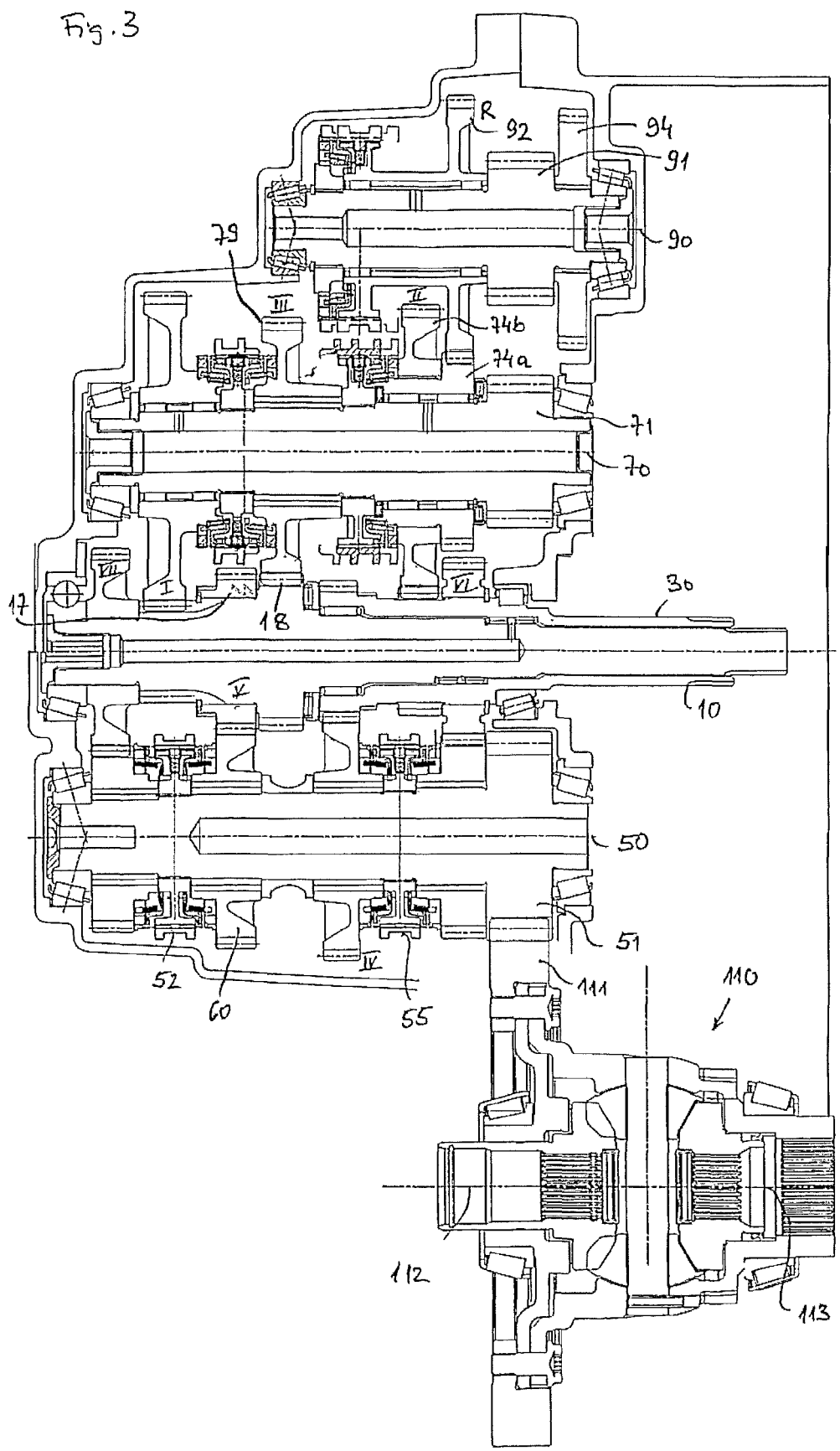
FIG. 3 a longitudinal section of a third embodiment.
Figure 4:
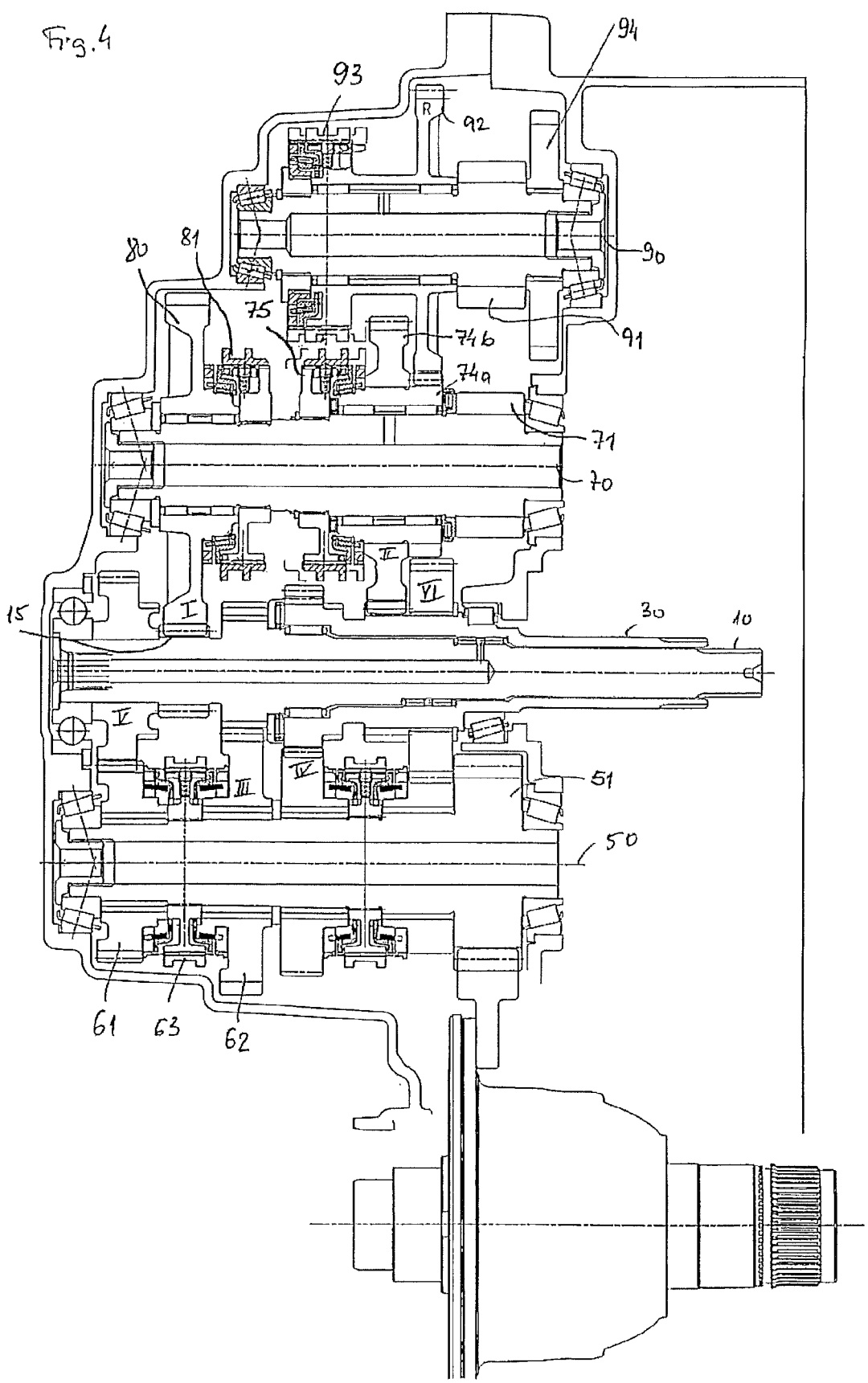
FIG. 4 a longitudinal section of a fourth embodiment.

The FIGS. 2 to 4 show other embodiments of the dual clutch transmission 1 according to the present invention. Component parts or features in the FIGS. 2 to 4 that are similar or identical with the component parts or features in FIG. 1 are denoted with the same reference numerals. The following description of FIGS. 2 to 4 does therefore concentrate essentially on the differences in comparison to the embodiments that have already been described.

Also in the embodiment shown in FIG. 2, here only shown schematically, the dual clutch transmission 1 comprises seven forward driving gears. In comparison to the embodiment according to FIG. 1, the embodiment according to FIG. 2 distinguishes from the embodiment shown as FIG. 1 in that the forward driving gears IV, VI are located on the drive shaft 50 in reverse order. The fourth forward driving gear IV is in this case established by a loose wheel 57 that engages a fixed wheel 36 that is provided on the second input shaft 30. The sixth forward driving gear VI comprising the gear wheels 48, 37 is now located closer to the input side 2 than the fourth forward driving gear IV.

A second difference can be found in that the first forward driving gear is provided closer to one axial end 76 of the second drive shaft 70. The loose wheels 77 provided on the drive shaft 70 and the fixed wheel 15 on the first input shaft 10 provide in this case a gear wheel connection for the first forward driving gear I. A bearing assembly 38 between the first and second input shafts 10, 30 is in this case not supported at a fixed carrier.

Further, it is to be noted that the transmission ratio of the third and fifth forward driving gears III, V are now dependent from each other. A loose wheel 78 on the second drive shaft and a loose wheel 59 on the first drive shaft 50 engage a fixed wheel 16 on the first input shaft 10. The gear wheel 78, 59 and 16 are in this case provided within the same plane extending perpendicular to the axes of the shafts of the transmission.

FIG. 3 shows another embodiment of the dual clutch transmission 1 according to the present invention. This embodiment distinguishes from the embodiment according to FIG. 2 in that the third and the fifth forward driving gears III, V are not dependent from each other. A loose wheel 60 of the fifth forward driving gear V is engaged by a fixed wheel 17, while a loose wheel 79 of the third forward driving gear III engages a fixed wheel 18 that is provided in axial direction adjacent to the fixed wheel 17. It is pointed out that it is also possible that the fifth forward driving gear V is established by a gear wheel connection wherein the loose wheel is provided on the second drive shaft 70 while accordingly a loose wheel for the third forward driving gear III is provided on the first drive shaft. This means that the gears III, V can be switched against each other. It is also possible that, starting from the embodiment shown in FIG. 3, that forward driving gears III, V are only switched with respect to each other in axial direction. In this case, the loose wheel of the fifth forward driving gear V would remain on the first drive shaft 50, but in the drawing according to FIG. 3 would be moved to the right, wherein at the same time the loose wheel of the third forward driving gear III remains on the second drive shaft 70 and is moved to the left.

FIG. 4 shows finally an embodiment comprising six forward driving gears. Loose wheels 61 and 62 of the forward driving gears III, IV are located next to each other and can be switched by means of a gear shifting clutch 63 that is located therebetween. The first forward driving gear I that is established by a loose wheel 80 and the fixed wheel 15 can be switched by means of the gear shifting clutch 81. The gear shifting clutch 81 is designed as a single gear shifting clutch and is spaced in axial direction apart from and located adjacent to the single gear shifting clutch 75. The single gear shifting clutch 75 is further mechanically coupled with the single gear shifting clutch 93 that is provided on the third drive shaft 90. On purpose, it has been chosen not to combine the two single gear shifting clutches 81 and 75 that are located on the same drive shaft.

The ring wheel 111 has been shown in its entirety in FIG. 2. It is part of a differential 110 that distributes the torque that has been transmitted into the ring wheel 111 into the two axles 112, 113.

LIST OF REFERENCE NUMERALS 1 dual clutch transmission
2 input side
3 first clutch
4 second clutch
5 crankshaft
6 carrier
7 interrupted line
10 first input shaft
11 fixed wheel
12 fixed wheel
13 fixed wheel
14 fixed wheel
15 fixed wheel
16 fixed wheel
17 fixed wheel
18 fixed wheel
30 second input shaft
31 fixed wheel
32 bearing assembly
33 fixed wheel
34 fixed wheel
35 fixed wheel
36 fixed wheel
37 fixed wheel
38 bearing assembly
32 fixed wheel
50 first drive shaft
51 pinion
52 gear shifting clutch
53 loose wheel
54 loose wheel
55 gear shifting clutch
56 loose wheel
57 loose wheel
58 loose wheel
59 loose wheel
60 loose wheel
61 loose wheel
62 loose wheel
63 gear shifting clutch
64 loose wheel
70 second drive shaft
71 pinion 72 loose wheel
73 gear shifting clutch
74 step wheel (with gear wheels 74a, 74b)
75 gear shifting clutch
76 axial end
77 loose wheel
78 loose wheel
79 loose wheel
80 loose wheel
81 gear shifting clutch
82 loose wheel
90 third drive shaft
91 pinion
92 loose wheel
93 gear shifting clutch
94 gear wheel (parking lock)
110 differential gear
111 end output shaft
112 axle
113 axle

What is claimed is:

1. A dual clutch transmission comprising:
a first input shaft;
a second input shaft;
a first drive shaft;
a second drive shaft;
a third drive shaft;
an output gear wheel that meshes with a first gear wheel fixed to the first drive shaft, a second gear wheel fixed to the second drive shaft, and a third gear wheel fixed to the third drive shaft; and
a plurality of driving gear speeds;
wherein
a respective gear wheel connection is allocated to each one of the driving gear speeds, each of these gear wheel connections comprising a respective loose wheel and fixed wheel;
a shiftable step wheel is provided on the second drive shaft, the step wheel comprising a first gear wheel and a second gear wheel;
the loose wheel of a reverse driving gear speed of the plurality of driving gear speeds is provided on the third drive shaft and engages the first gear wheel of the step wheel;
the fixed wheel of a second forward driving gear speed of the plurality of driving gear speeds is provided on one of the input shafts and is engaged by the second gear wheel of the step wheel; and
the step wheel is switchable by a first gear shifting clutch that is provided on the second drive shaft, said first gear shifting clutch being designed as a first single gear shifting clutch that selectively connects only the step wheel in a rotationally fixed manner to the second drive shaft such that the step wheel co-rotates with the second drive shaft.

2. The dual clutch transmission according to claim 1, wherein the loose wheel of the reverse driving gear speed can be shifted by a second single gear shifting clutch.

3. The dual clutch transmission according to claim 2, wherein the first single gear shifting clutch for shifting the step wheel and the second single gear shift clutch for shifting the loose wheel of the reverse 1 driving gear speed are coupled via a mutual gear shifting fork.

4. The dual clutch transmission according to claim 1, wherein the fixed wheel of the second forward driving gear speed is located on the second input shaft that is designed as a hollow shaft.

5. The dual clutch transmission according to claim 1, wherein the fixed wheel of a fourth or sixth forward driving gear speed of the plurality of driving gear speeds is located on the second input shaft between the fixed wheel of the second forward driving gear speed and an input side of the dual clutch transmission.

6. The dual clutch transmission according to claim 5, wherein the loose wheels of the fourth and the sixth forward driving gears speeds of the plurality of driving gear speeds can be gear shifted via a dual gear shifting clutch that is provided on the first drive shaft.

7. The dual clutch transmission according to claim 5, wherein the fixed wheels of the fourth or sixth forward driving gears speeds of the plurality of driving gear speeds and the loose wheel of the reverse driving gear speed of the plurality of driving gear speeds are provided in a plane that extends perpendicular to a main axis of the dual clutch transmission.

8. The dual clutch transmission according to claim 1, wherein the first gear wheel of the step wheel comprises a smaller diameter 1 than the second gear wheel of the step wheel, and wherein the first gear wheel is provided between the second gear wheel and the input side.

9. The dual clutch transmission according to claim 1, wherein the loose wheel of a third forward driving gear speed of the plurality of driving gear speeds and the loose wheel of a fifth forward driving gear speed of the plurality of driving gear speeds are provided in one plane that extends perpendicular to a main axis of the dual clutch transmission and both loose wheels are engaged by a mutual one of the fixed wheels of the plurality of driving gear speeds.

10. The dual clutch transmission according to claim 1, wherein the fixed wheel of a first forward driving gear speed of the plurality of driving gear speeds is located at an outer axial end of the second input shaft.

11. The dual clutch transmission according to claim 1, wherein a bearing assembly that supports the second input shaft on the first input shaft is supported by a fixed carrier.

12. The dual clutch transmission according to claim 1, wherein the loose wheel of a seventh forward driving gear speed of the plurality of driving gear speeds is provided on the first drive shaft.

13. The dual clutch transmission according to claim 1, wherein a plurality of gear shifting clutches including the first gear shifting clutch are all provided on the first, second or third drive shafts.

14. The dual clutch transmission according to claim 1, wherein an additional gear wheel is provided as a parking lock on the third drive shaft.

* * * * *

UNITED STATES PATENT AND TRADEMARK OFFICE
CERTIFICATE OF CORRECTION

PATENT NO. : 8,333,126 B2
APPLICATION NO. : 12/762248
DATED : December 18, 2012
INVENTOR(S) : Hans Enstroem and Andreas Hegerath Page 1 of 1

It is certified that error appears in the above-identified patent and that said Letters Patent is hereby corrected as shown below:

In the Claims:

Column 10, Lines 27-31

Currently Reads in claim 8:

8. The dual clutch transmission according to claim 1, wherein the first gear wheel of the step wheel comprises a smaller diameter 1 than the second gear wheel of the step wheel, and wherein the first gear wheel is provided between the second gear wheel and the input side.

Should read in claim 8:

8. The dual clutch transmission according to claim 1, wherein the first gear wheel of the step wheel comprises a smaller diameter than the second gear wheel of the step wheel, and wherein the first gear wheel is provided between the second gear wheel and the input side.

Signed and Sealed this
Fourteenth Day of May, 2013

Teresa Stanek Rea
*Acting Director of the United States Patent and Trademark Office*